(12) United States Patent
Furukawa et al.

(10) Patent No.: US 8,174,487 B2
(45) Date of Patent: *May 8, 2012

(54) DISPLAY UNIT AND BACKLIGHT UNIT

(75) Inventors: Norimasa Furukawa, Tokyo (JP);
Kenichi Kikuchi, Kanagawa (JP);
Hiroaki Ichikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 556 days.

This patent is subject to a terminal disclaimer.

(21) Appl. No.: 12/370,578

(22) Filed: Feb. 12, 2009

(65) Prior Publication Data

US 2009/0153464 A1 Jun. 18, 2009

Related U.S. Application Data

(63) Continuation of application No. 11/176,391, filed on Jul. 8, 2005, now Pat. No. 7,511,695.

(30) Foreign Application Priority Data

Jul. 12, 2004 (JP) ................................ P2004-205144

(51) Int. Cl.
*G09G 3/34* (2006.01)
(52) U.S. Cl. ........................................................ 345/102
(58) Field of Classification Search .................. 345/76, 345/77, 82, 101–102; 349/61; 348/471
See application file for complete search history.

(56) References Cited

U.S. PATENT DOCUMENTS

| | | | |
|---|---|---|---|
| 6,392,358 B1 | 5/2002 | Runau et al. | |
| 6,441,558 B1 | 8/2002 | Muthu et al. | |
| 6,717,559 B2 | 4/2004 | Weindorf | |
| 6,753,661 B2 | 6/2004 | Muthu et al. | |
| 6,888,529 B2 | 5/2005 | Bruning et al. | |
| 7,202,613 B2 | 4/2007 | Morgan et al. | |
| 7,301,523 B2 | 11/2007 | Kamei | |
| 7,345,679 B2 * | 3/2008 | Katayose | 345/173 |
| 2002/0070914 A1 | 6/2002 | Bruning et al. | |
| 2002/0097000 A1 | 7/2002 | Muthu et al. | |
| 2003/0230991 A1 | 12/2003 | Muthu et al. | |

FOREIGN PATENT DOCUMENTS

| | | |
|---|---|---|
| JP | 11-305196 | 11/1999 |
| JP | 2001-272938 | 10/2001 |
| JP | 2003-188415 | 7/2003 |
| JP | 2004-29141 | 1/2004 |
| JP | 2004-193029 | 7/2004 |
| WO | WO 02/47438 A2 | 6/2002 |

* cited by examiner

*Primary Examiner* — Abbas Abdulselam
(74) *Attorney, Agent, or Firm* — Finnegan, Henderson, Farabow, Garrett & Dunner, LLP

(57) ABSTRACT

The disclosure includes various embodiments including, for example:

(i) a color liquid crystal display unit has a color display panel of transmissive type and a backlight unit placed behind the color display panel; (ii) a backlight unit has a plurality of LEDs connected in series and a drive unit to drive the LEDs; (iii) a temperature sensor to detect the temperature of LEDs; (iv) groups of LEDs are arranged in regions where the display unit has the same temperature; and (v) a drive unit controls current to be supplied to LEDs in response to temperature detected by the temperature sensor so that the LEDs retain the constant brightness even when the LEDs fluctuate in temperature.

9 Claims, 15 Drawing Sheets

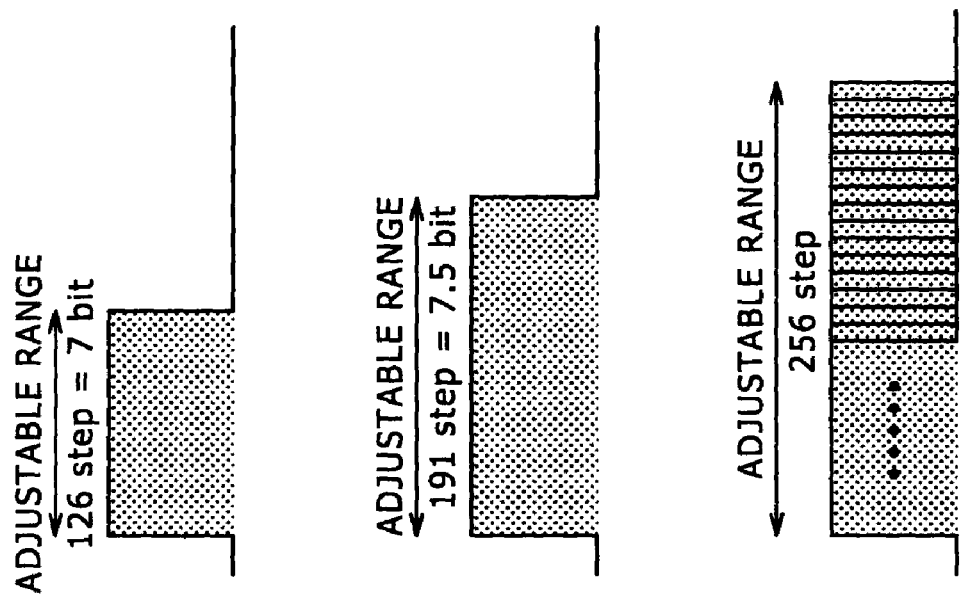
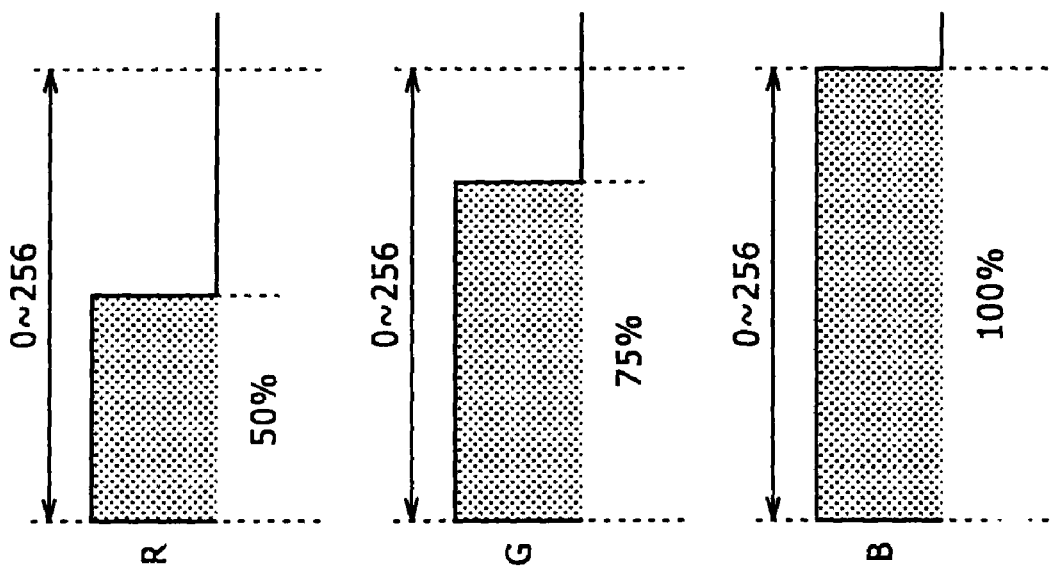
FIG. 13A
FIG. 13B
FIG. 13C

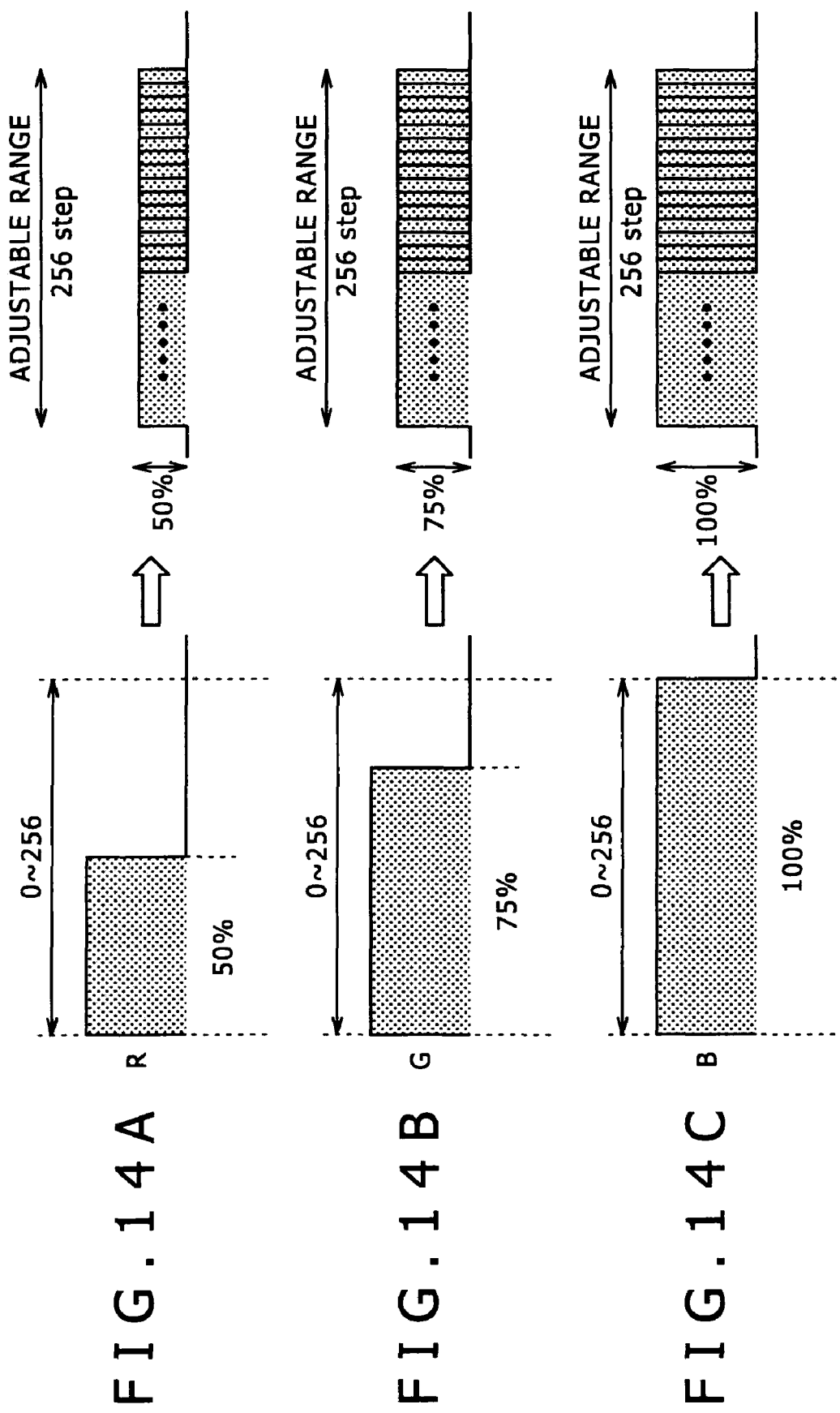

DISPLAY UNIT AND BACKLIGHT UNIT

CROSS-REFERENCE TO RELATED APPLICATIONS

This is a Continuation of application Ser. No. 11/176,391, filed on Jul. 8, 2005, now U.S. Pat. No. 7,511,695, which claims priority to JP 2004-205144, filed on Jul. 12, 2004, the contents of all of which are incorporated herein by reference.

BACKGROUND OF THE INVENTION

The present invention relates to a display unit with a non-luminous screen of transmissive-type and also to a backlight unit placed behind the screen.

Liquid crystal panels are usually provided with a backlight unit composed of cold cathode fluorescent lamps (CCFL). However, there is a demand for a mercury-free backlight unit from the standpoint of environmental protection. Light emitting diodes (LEDs) are regarded as promising in this respect as a substitute for CCFLs. Application of LEDs to televisions is under meticulous research because of their ability to produce a well-balanced white color by optical color mixing from LEDs emitting red, green, and blue elementary colors.

The disadvantage of using LEDs as the light source is the necessity of supplying red LEDs, green LEDs, and blue LEDs with current independently because they differ in luminous efficiency. Moreover, LEDs vary in their semiconductor compositions depending on their emitting color and hence vary in their driving voltage and power consumption. However, it is not practical to individually drive LEDs constituting the backlight unit.

In practical use of LEDs as the light source of backlight unit, it is common practice to divide LEDs into a certain number of groups and drive each group (in which LEDs are connected in series) as a whole.

In other words, each group consists of a prescribed number of red, green, and blue LEDs connected in series, and each group is connected to a DC-DC converter power source and a PWM control unit. Thus it is possible to adjust the tint and brightness of backlight (which result from combination of red, green, and blue) by adjusting the current (through PWM control) supplied to the LEDs in each group.

Patent Document 1:
Japanese Patent Laid-open No. 2001-272938

SUMMARY OF THE INVENTION

Incidentally, LEDs vary in amount of light emission depending on temperature and this temperature dependence also varies depending on the color they produce. FIG. 15 is a graph showing the fundamental temperature characteristics of red, green, and blue LEDs. In FIG. 15, X-axis represents the element temperature and Y-axis represents the relative brightness (or output). The relative brightness is expressed in terms of percent, with 100% denoting the output of the element at 25° C.

The red LED is a semiconductor in layer structure which is composed of four elements (Al, In, Ga, and P). Having a low band gap energy, it decreases in the amount of light emission at a high temperature owing to decrease in the amount of carriers contributing to light emission. Consequently, at about 75° C. for ordinary light emission its luminance decreases to about 70% of that at normal temperature (25° C.). This change is much larger than change in green and blue LEDs.

By contrast, green and blue LEDs composed of three elements (In, Ga, and N) are less vulnerable to temperature change because of their large band gap energy resulting from their shorter wavelengths than red and closer to violet. In fact, it is noticed from FIG. 15 that the temperature characteristics of the blue LED(B) is almost flat.

The LEDs as the light source for backlight of liquid crystal display units are usually run in such a way that individual LEDs are supplied with a large amount of electric power so as to reduce the total number of LEDs. In addition, the LEDs are connected in series and hence each series greatly fluctuates in load due to heat resistance. As the result, the LEDs fluctuate in heat generation and hence in temperature moment by moment. Consequently, the red LEDs greatly decrease in luminance, whereas the blue LEDs almost remain unchanged in luminance.

Also, the surrounding air in the display unit is warmed up by the heat generated by LEDs and the relative density of the air decreases. As a result, the air in the display unit rises upwards.

Accordingly, in case which LEDs are used as the light source for backlight of the liquid crystal display units, the liquid crystal display unit with a backlight of LEDs gets hot in the upper part and remains cool in the lower part. The hot upper part decreases in red light output and hence becomes bluish, and the cool lower part remains the same in red light output. As the result, the display unit varies in brightness and tint from its upper part to its lower part.

This problem becomes serious in proportion to the display size.

One way to tackle this problem is to eliminate the variation of display brightness due to temperature distribution.

The gist of the present invention resides in a backlight unit installed in the back of a display unit, which includes a lighting unit composed of a plurality of LEDs connected in series, a drive unit to drive LEDs in the lighting unit, each drive unit corresponding to each lighting unit, and a temperature detecting unit to detect the temperature of each lighting unit, the lighting units being arranged in various positions at which the LEDs keep a prescribed temperature, and the drive units controlling current to be supplied to the LEDs in each lighting unit according to the temperature of each lighting unit, which is detected by the temperature detecting unit, so that each lighting unit keeps brightness uniform even though each lighting unit changes in temperature.

According to one embodiment of the present invention, the LEDs in each lighting unit are arranged in series horizontally and the lighting units are arranged at positions where the temperature is approximately the same because of the temperature distribution resulting from the heat generation of the lighting unit per se. Therefore, the drive unit controls current to be supplied to LEDs in each lighting unit according to the temperature, which is detected by the temperature detecting unit, thereby keeping the backlight unit uniform in brightness even though the lighting unit changes in temperature.

The gist of the present invention resides also in a display unit which includes a non-luminous screen of transmissive-type, a lighting unit which is placed behind the screen and is composed of a plurality of LEDs connected in series, a drive unit to drive LEDs in each lighting unit, the drive unit corresponding to each lighting unit, and a temperature detecting unit to detect the temperature of each lighting unit, the lighting units being arranged in various positions at which the LEDs keep a prescribed temperature, and the drive units controlling current to be supplied to the LEDs in each lighting unit according to the temperature of each lighting unit, which is detected by the temperature detecting unit, so that each lighting unit keeps at least brightness uniform even though each lighting unit changes in temperature.

The backlight unit and display unit according to the present invention employ, as the light source, lighting units each composed of a plurality of LEDs connected in series. The LEDs constituting each lighting unit are arranged in varied positions where they keep a prescribed temperature, and the drive units control current to be supplied to the LEDs in each lighting unit, so that each lighting unit keeps a uniform brightness even though each lighting unit changes in temperature.

The backlight unit and display unit constructed as mentioned above retain a constant brightness and tint irrespective of temperature distribution on the screen.

BRIEF DESCRIPTION OF THE DRAWINGS

FIGS. 13A to 13C are diagrams showing PWM pulses to drive individual red, green, and blue LEDs.

FIGS. 14A to 14C are diagrams showing signals to drive individual red, green, and blue LEDs, with peak values and PWM controlled.

DETAILED DESCRIPTION OF THE PREFERRED EMBODIMENTS

The embodiments of the present invention will be described in more detail with reference to the accompanying drawings.

Figure 1:
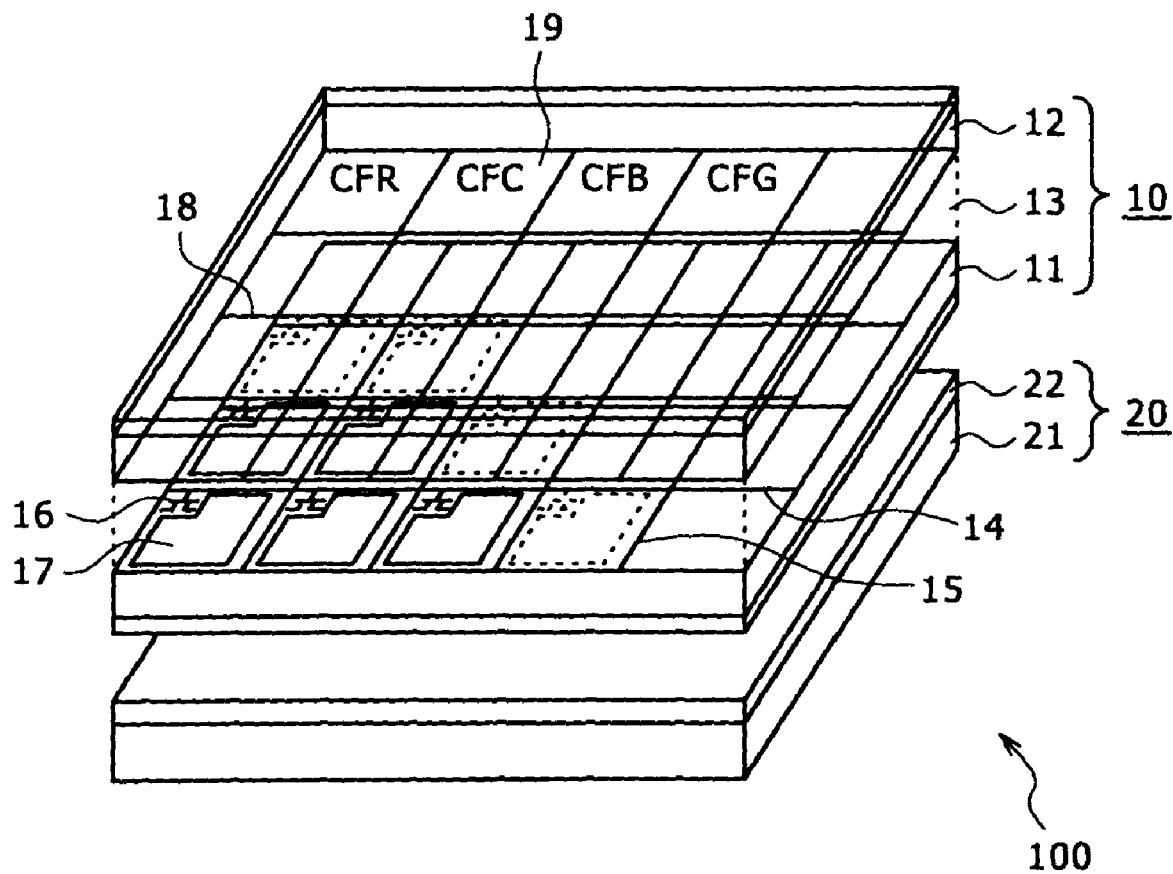
FIG. 1 is a schematic perspective view showing the structure of the color liquid crystal display unit of backlight type to which the present invention has been applied.

The present invention is applicable to the color liquid crystal unit 100 of backlight type constructed as shown in FIG. 1.

The color liquid crystal display unit 100 consists of a color display panel 10 of transmissive type and a backlight unit 20 placed behind the color display panel 10.

The color liquid crystal display panel 10 of transmissive type has the TFT substrate 11 and the opposed electrode substrate 12, which face each other with the liquid crystal layer 13 (of twisted nematic TN liquid crystal) interposed between them. The TFT substrate 11 has signal lines 14 and scanning lines 15 formed thereon in a matrix pattern. At their intersections are formed thin-film transistors 16 (as switching elements) and pixel electrodes 17. The thin film transistors 16 are sequentially selected by the scanning lines 15; they also write the image signals (supplied from the signal lines 14) into the corresponding pixel electrodes 17. On the inside of the opposed electrode substrate 12 are formed opposed electrodes 18 and color filters 19.

The color liquid crystal display unit 100 has the color liquid crystal display panel 10 of transmissive type mentioned above, which is held between two polarizers and illuminated with white light from its rear by the backlight unit 20. Upon active matrix driving, it produces full-color images as desired.

The backlight unit 20 has the light source 21 and the wavelength selecting filter 22, so that it illuminates (from rear through the wavelength selecting filter 22) the color liquid crystal panel 10 with the light emitted from the light source 21.

Figure 2:
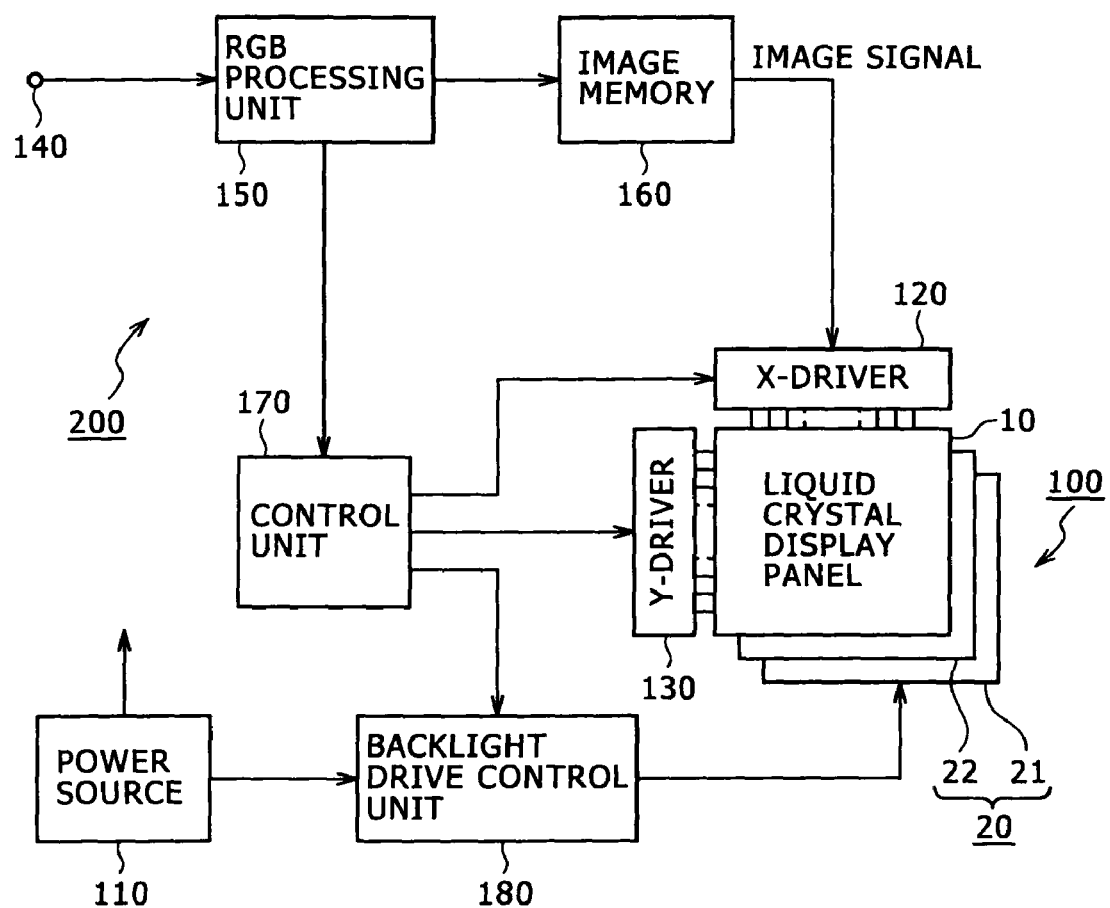
FIG. 2 is a block diagram showing the structure of the drive circuit of the color liquid crystal display unit mentioned above.

The color liquid crystal display unit 100 is driven by the drive circuit 200 whose electrical block diagram is shown in FIG. 2.

The drive circuit 200 consists of the power source 110 (to supply the color liquid crystal display panel 10 and the backlight unit 20 with electric power), the X driver circuit 120 and the Y driver circuit 130 (to drive the color liquid crystal display panel 10), the RGB processing unit 150 (to be supplied with external image signals through the input terminal 140), the image memory 160 and the controller 150 (which are connected to the RGB processing unit 150), and the backlight control unit 180 (to drive and control the backlight unit 20).

In the drive circuit 200, the image signals entered through the input terminal 140 are processed such as a chromatic process or the like by the RGB processing unit 150 and the processed signals are converted from composite signals into RGB separate signals suitable for the driving of the color liquid crystal display panel 10. The RGB separate signals are supplied to the control unit 170 and also to the X driver 120 through the image memory 160. The control unit 170 controls the X driver 120 and Y driver 130 at a prescribed timing corresponding to the RGB separate signals. The RGB separate signals supplied to the X driver 120 through the image memory 160 drive the color liquid crystal display panel 10, thereby producing images corresponding to the RGB separate signals.

The backlight unit 20 is placed behind the color liquid crystal display panel of transmissive type 10, so that it illuminates directly the rear of the color liquid crystal display panel 10. The light source 21 of the backlight unit 20 consists of a plurality of light emitting diodes (LEDs). These LEDs are divided into several groups, which are driven individually.

The LEDs constituting the light source 21 of the backlight unit 20 are arranged in the following manner.

Figure 3:
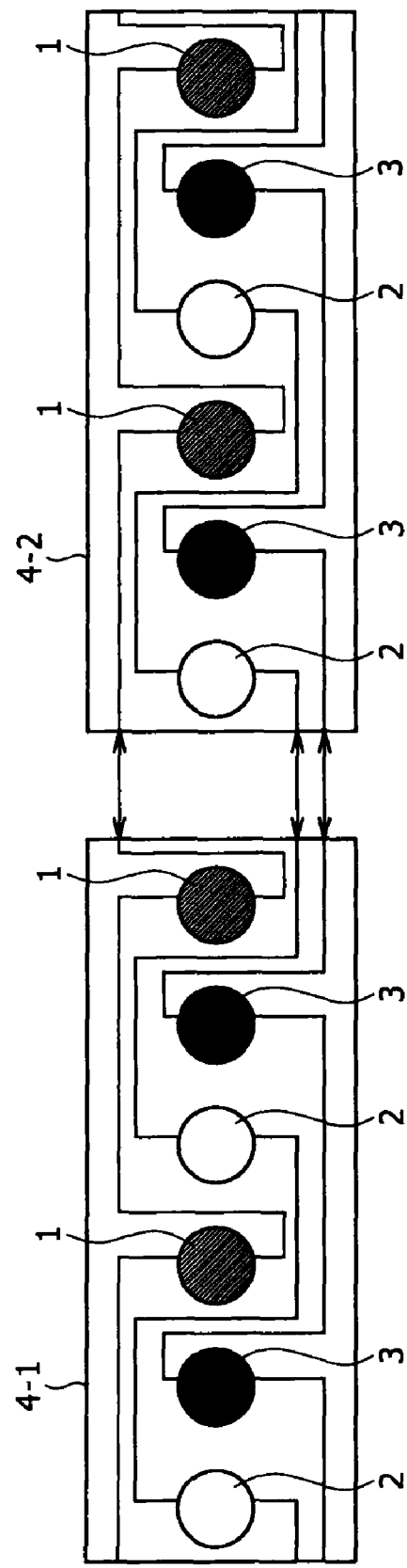
FIG. 3 is a schematic diagram showing the arrangement of LEDs in the backlight unit constituting the color liquid crystal display unit mentioned above.

FIG. 3 schematically shows the arrangement of LEDs. Each unit cell (4-1 and 4-2) has six LEDs (two each of red LEDs 1, green LEDs 2, and blue LEDs 3) which are arranged in one line.

In this case mentioned above, the unit 4 has six LEDs. However, the number of LEDs for each color in one unit cell is not limited to the one mentioned above; it may be properly varied to produce a well-balanced white color (mixed color) according to the rating and emitting efficiency of LEDs employed.

Figure 4:
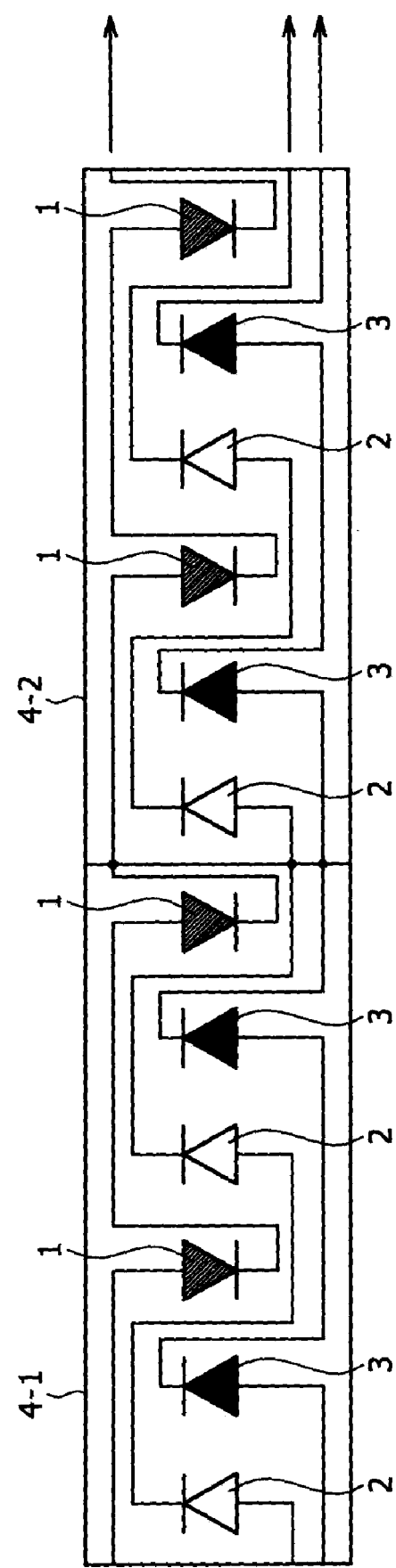
FIG. 4 is a schematic diagram showing the arrangement of LEDs mentioned above in which individual LEDs are represented by diode symbols for circuit diagrams.

In the case shown in FIG. 3, the unit cells 4-1 and 4-2 have the identical arrangement of LEDs, and they are connected to each other at the center (indicated by arrows). FIG. 4 shows the unit cells 4-1 and 4-2 connected to each other, in which LEDs are represented by symbols for electric circuit drawings. The red LEDs 1, green LEDs 2, and blue LEDs 3 are connected in series separately, with their polarity conforming to the direction of current flow (left to right).

Figure 5:
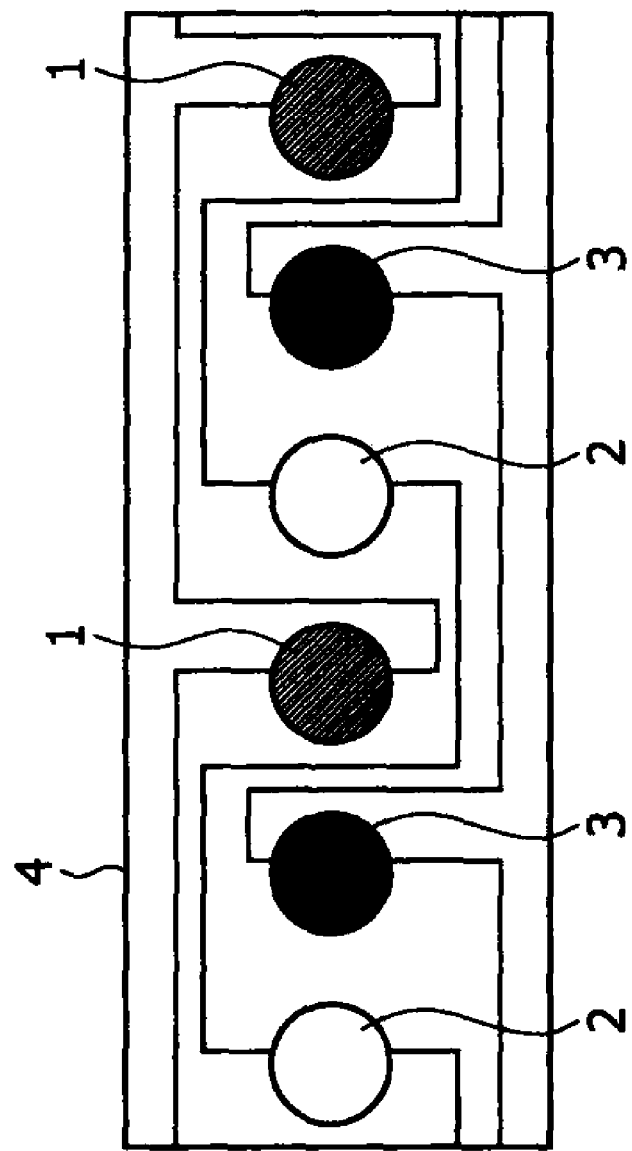
FIG. 5 is a schematic diagram showing a unit cell in which six diodes (two each of red, green, and blue diodes) are arranged in one line.
Figure 6:
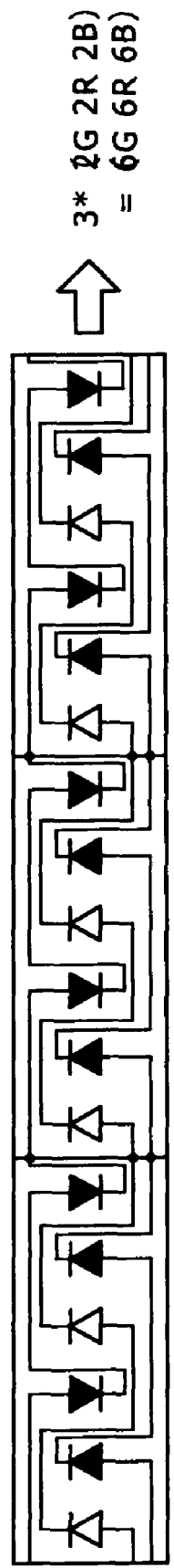
FIG. 6 is a schematic diagram showing three unit cells 4 joined together.

FIG. 5 shows one unit cell 4 consisting of six LEDs (two each of red LEDs 1, green LEDs 2, and blue LEDs 3) which are arranged in one line. Each set of two LEDs is represented by 2G, 2R, and 2B as shown in FIG. 5, and the set (2G 2R 2B) denotes the basic unit as the pattern of six LEDs including two each of green, red, and blue. In FIG. 6, three unit cells 4 joined in series is represented by 3*(2G 2R 2B) or (6G 6R 6B).

The LEDs constituting the light source 21 of the backlight unit 20 are connected in the following manner.

Figure 7:
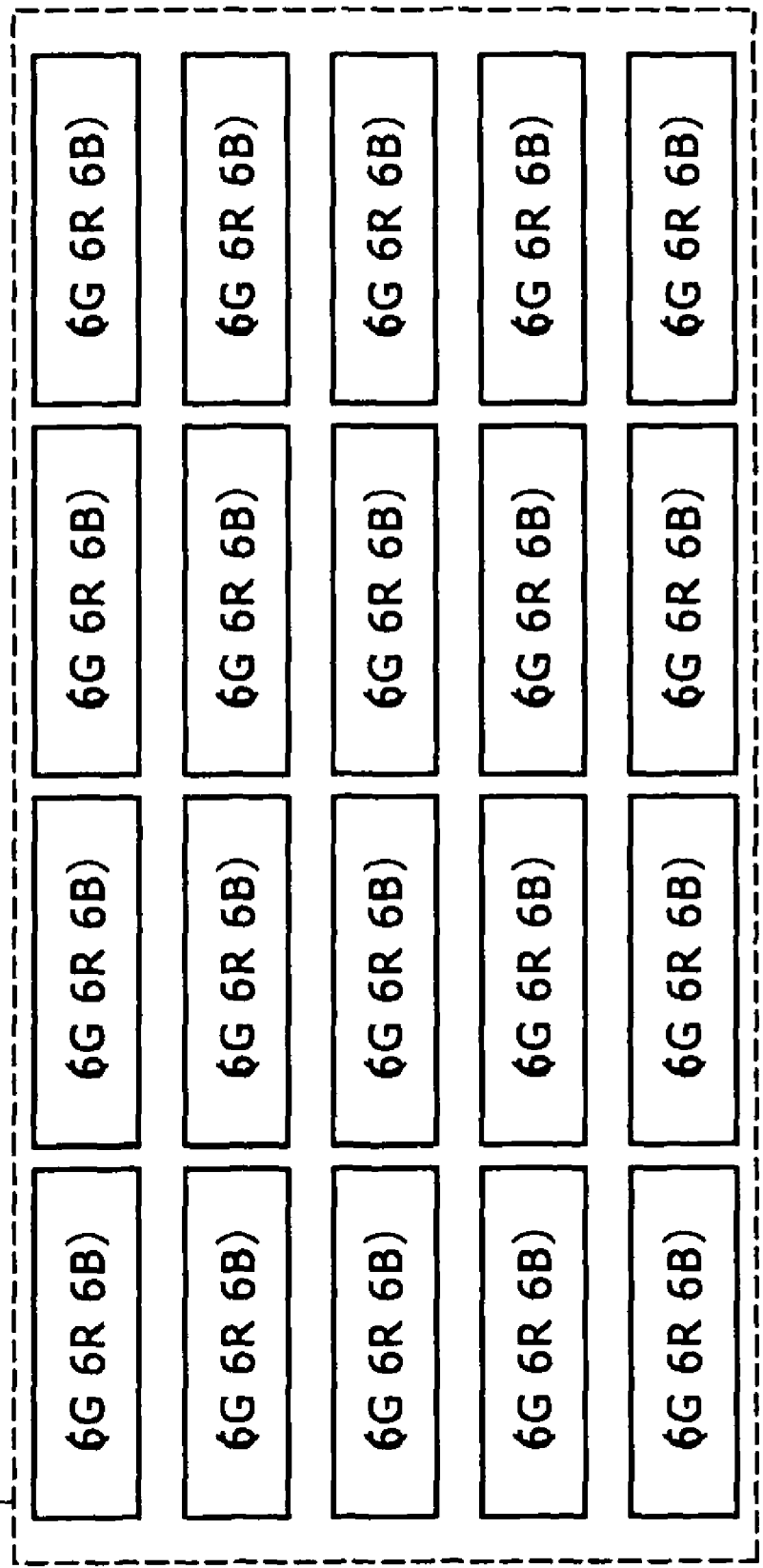
FIG. 7 is a schematic diagram showing the actual connection of LEDs in the light source 21 of the backlight unit.

The LEDs in the light source 21 are grouped into intermediate units (6G 6R 6B) which are arranged in a matrix pattern (five horizontal rows and four vertical columns), as shown in FIG. 7. Each intermediate unit consists of three basic units (2G 2R 2B). Therefore, there are 360 LEDs in total.

Figure 8:
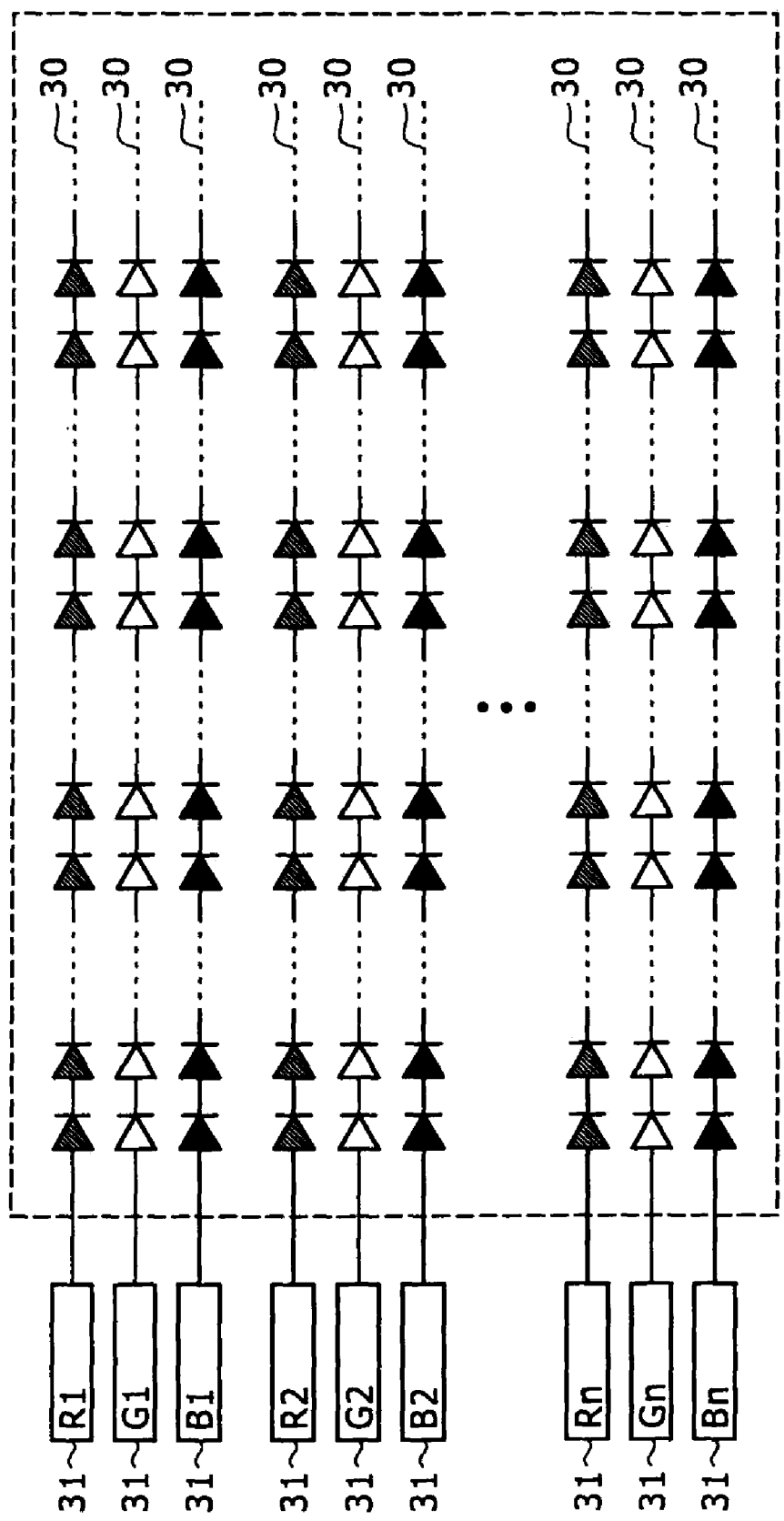
FIG. 8 is a schematic diagram showing the connection of LEDs in the backlight unit mentioned above.

These intermediate units (6G 6R 6B) are electrically connected in the horizontal direction on the screen. The arrangement of intermediate units in this manner results in a plurality of the groups of LEDs 30 connected side by side horizontally formed in the light source 21 of the backlight unit 20 as shown in FIG. 8.

Each group of LEDs 30 connected in series horizontally is provided with the independent LED drive circuit 31 in the backlight unit 20. The LED drive circuit 31 supplies current to the groups of LEDs 30, thereby causing them to emit light.

The groups of LEDs 30 horizontally connected in series are arranged such that those LEDs in a certain region have approximately the same temperature when the temperature distribution is gauged in the backlight unit 20.

Figure 9:
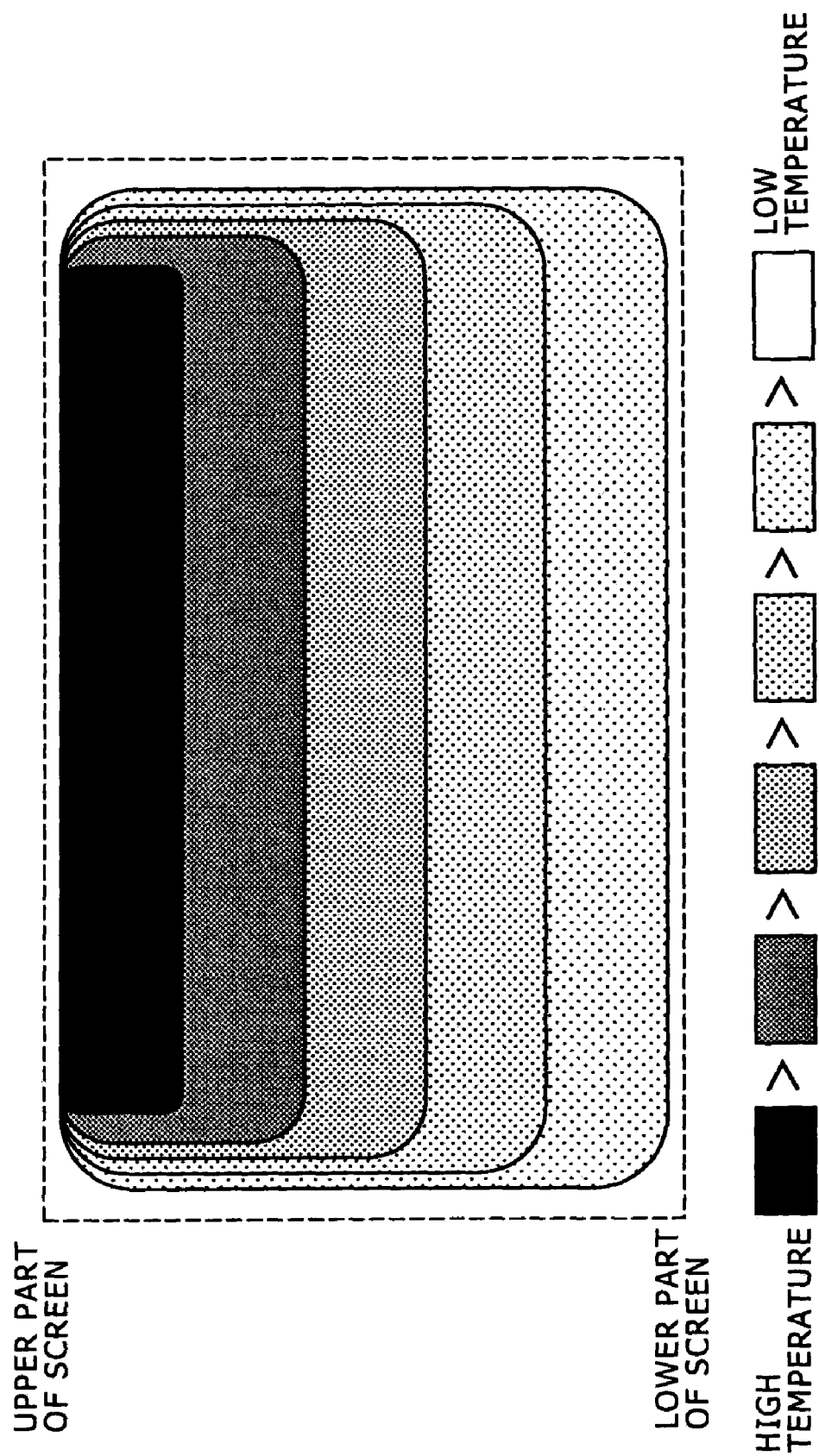
FIG. 9 is a schematic diagram showing the temperature distribution in the display unit.

FIG. 9 shows the temperature distribution on the screen of the color liquid crystal display unit 100, with the backlight unit 20 working. Densely hatched parts indicate the region of high temperature and lightly hatched parts indicate the region of low temperature. It is noted from FIG. 9 that the color liquid crystal display unit 100 has a high temperature in its upper region and a low temperature in its lower region.

Figure 10:
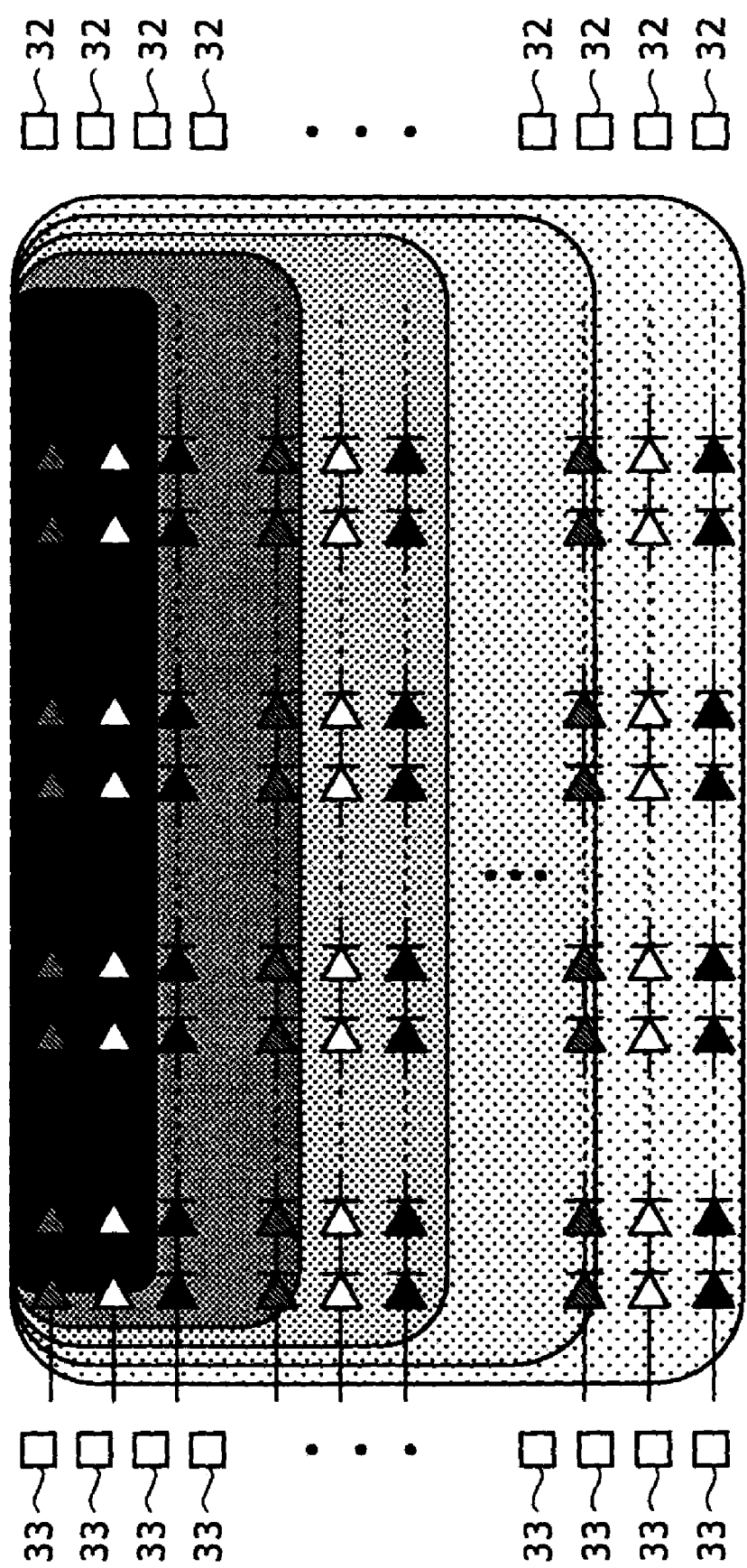
FIG. 10 is a schematic diagram in which the temperature distribution in the display unit is superposed on the connection of LEDs in the backlight unit.

FIG. 10 is a schematic diagram in which the temperature distribution in the display unit (which is shown in FIG. 9) is superposed on the connection of LEDs in the backlight unit (which is shown in FIG. 8). It is noticed from FIG. 10 that connecting LEDs in the horizontal direction is equivalent to connecting LEDs at approximately the same temperature.

Figure 11:
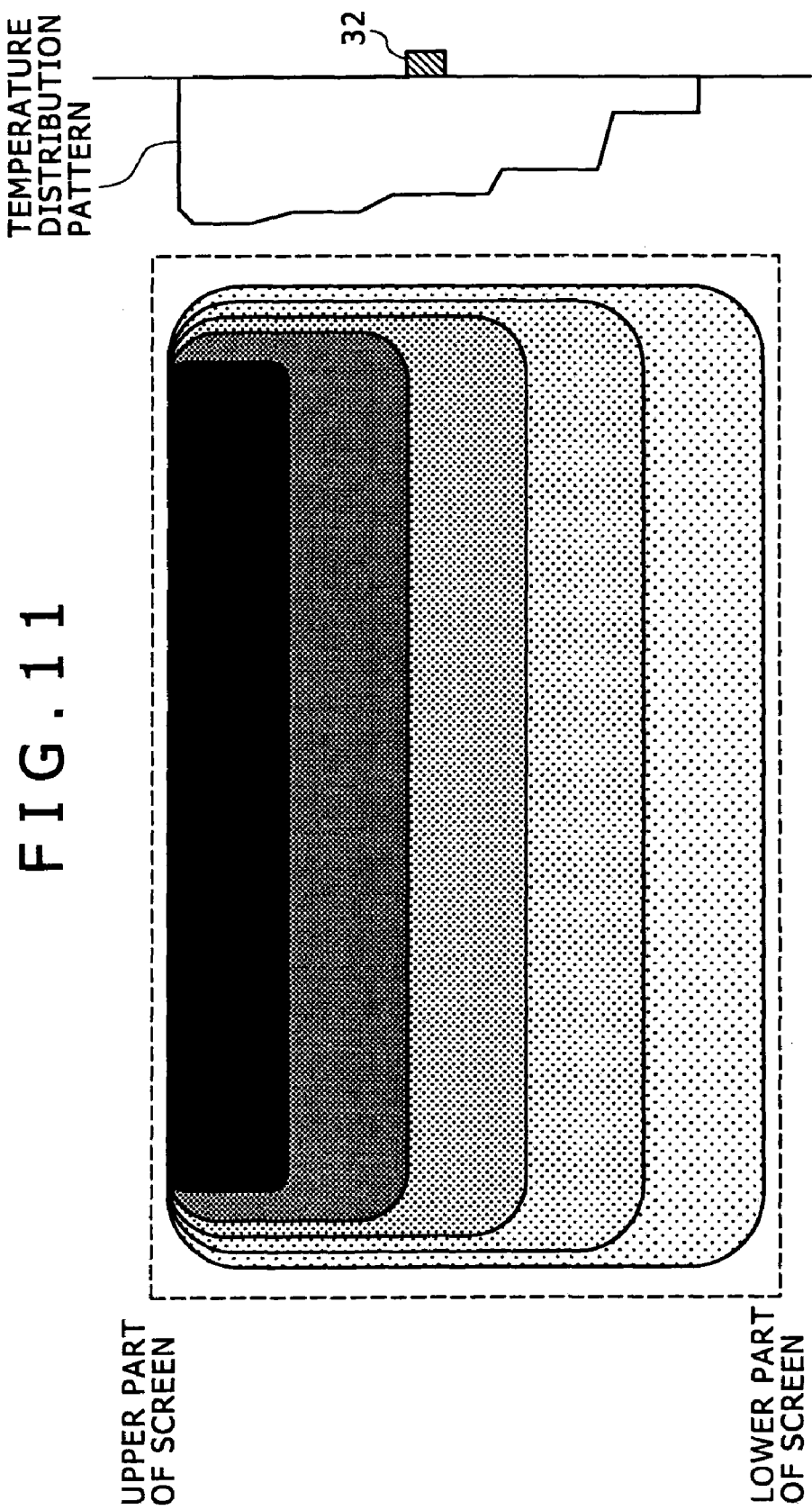
FIG. 11 is a diagram which is used to estimate the temperature at each position from one temperature sensor and the temperature distribution pattern.

As shown in FIG. 10, the backlight unit 20 is provided with temperature sensors 32 to detect the temperature of each group of LEDs 30. There are a plurality of temperature sensors 32 arranged vertically, each corresponding to the group of LEDs 30 horizontally connected in series. The arrangement of temperature sensors 32 may be modified as shown in FIG. 11. The display unit shown in FIG. 11 has only one temperature sensor 32 at its center, and it also has a memory recording the pattern of temperature distribution in the vertical direction. The temperature sensor 32 can estimate from the detected value of the temperature at different regions across the screen in the vertical direction, by referencing the content of the memory. The information about temperature detected by the temperature sensor 32 is sent to the LED drive circuit 31 that drives the corresponding groups of LEDs 30.

In addition, as shown in FIG. 10, the backlight unit 20 is provided the light quantity sensor or chromaticity sensor 33, which detects the luminance or chromaticity of each group of LEDs 30. The embodiment shown in FIG. 10 has a plurality of luminance or chromaticity sensors 33, each corresponding to the groups of LEDs 30 horizontally connected in series. This embodiment may be modified such that the backlight unit 20 has only one luminance or chromaticity sensor 33 if it is provided with a diffuser panel that uniformly and efficiently mixes the colors of individual LEDs. In this case, the luminance or chromaticity value detected by the luminance or chromaticity sensor 33 is supplied to the LED drive circuit 31 that drives the corresponding groups of LEDs 30. However, it is possible to use only one luminance or chromaticity sensor 33 if the backlight unit 20 is provided with a diffuser panel or any other optical system that uniformly and effectively mixes LEDs colors.

The LED drive circuit 31, which is placed in the backlight drive control unit 180, drives the groups of LEDs 30 which are horizontally connected in series in the following manner.

Figure 12:
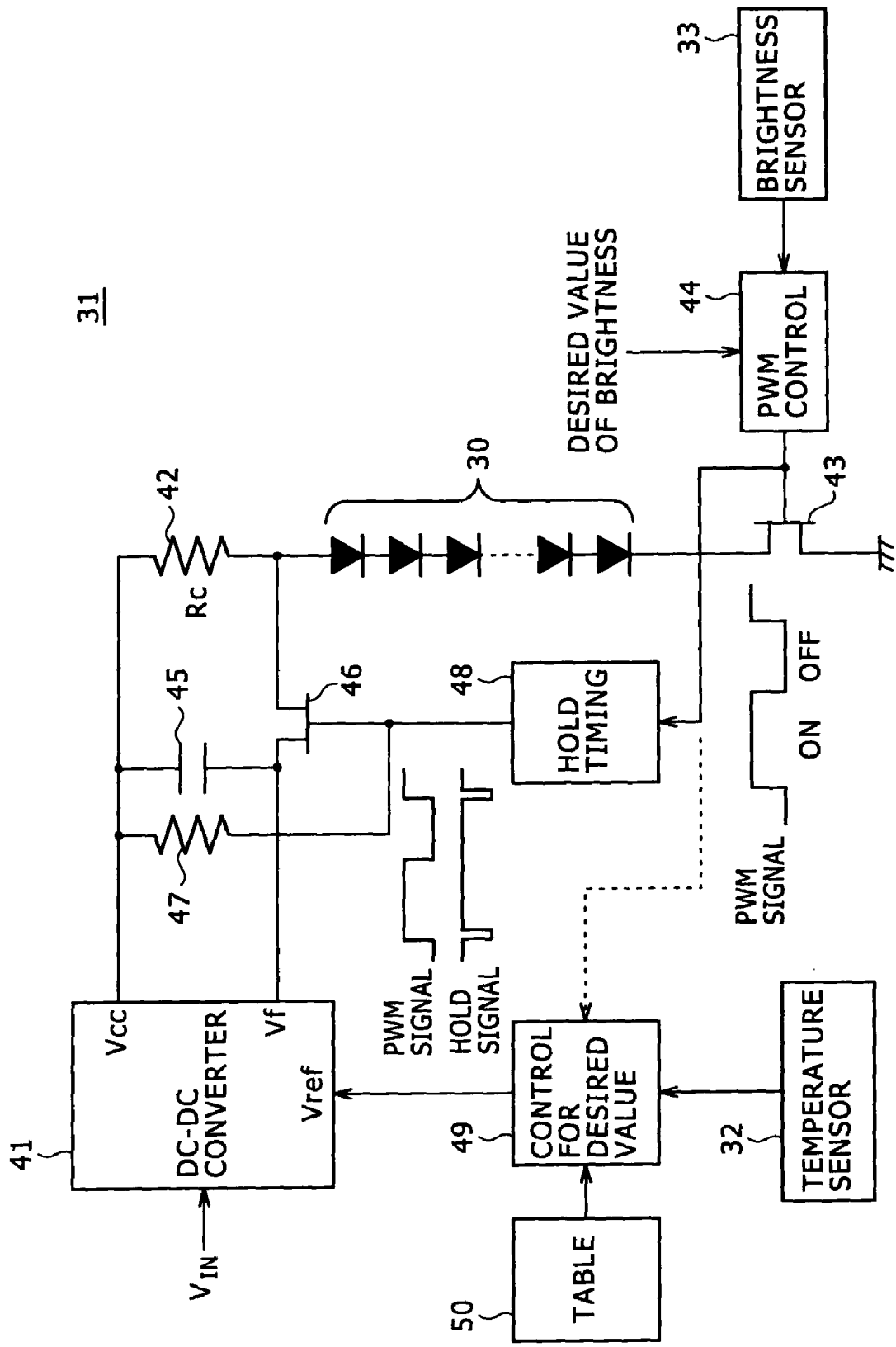
FIG. 12 is a diagram showing the drive circuit to drive LEDs.
Figure 15:
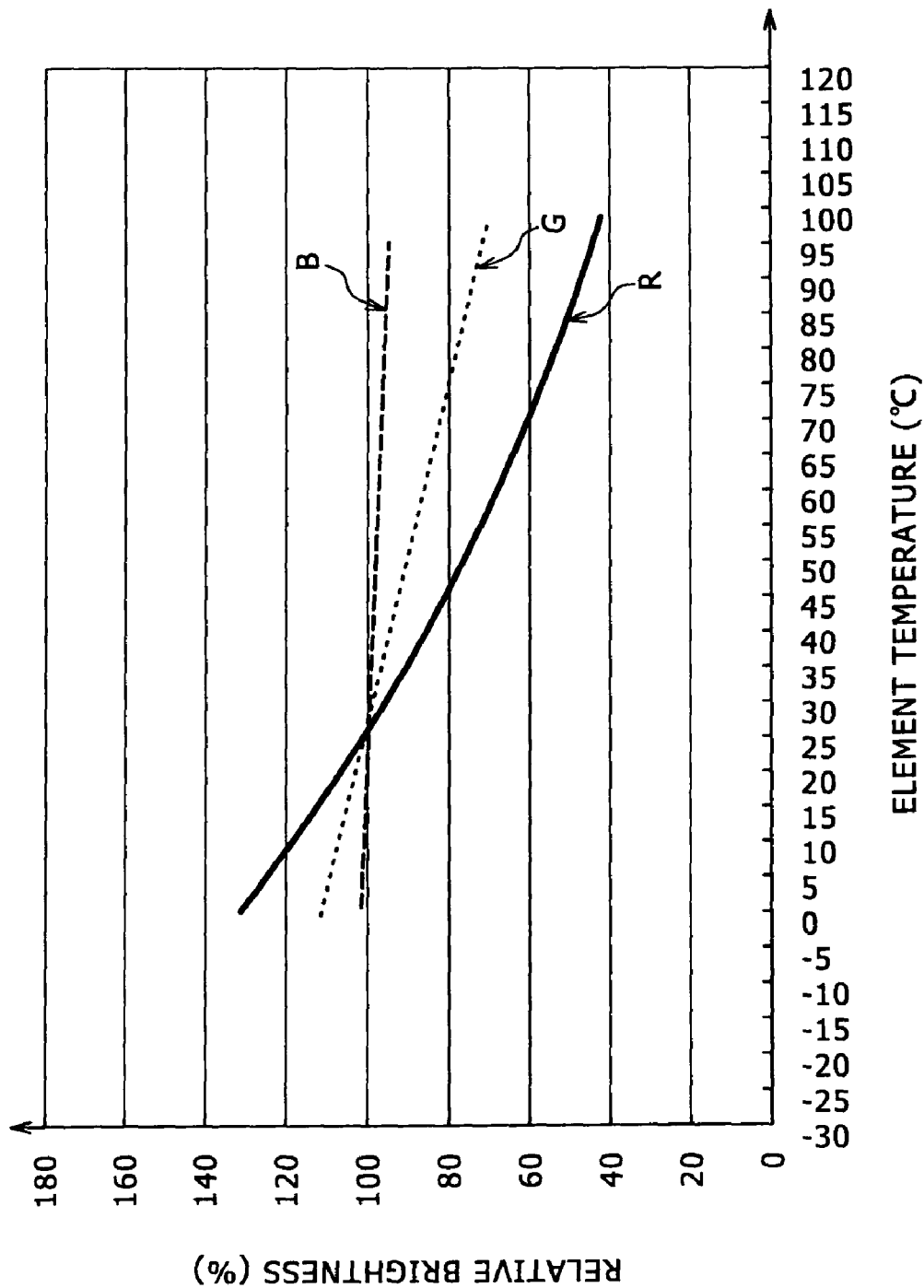
FIG. 15 is a diagram showing the fundamental temperature characteristics of red, green, and blue LEDs.

FIG. 12 shows an example of the LED drive circuit 31.

The LED drive circuit 31 has the DC-DC converter 41, the constant resistance ($R_c$) 42, the FET 43, the PWM control circuit 44, the capacitor 45, the sample holding FET 46, the resistance 47, and the hold timing circuit 48.

The DC-DC converter 41 receives a DC voltage $V_{IN}$ from the power source 110 shown in FIG. 2. Then it converts its input (DC power) into a stabilized DC output voltage $V_{cc}$ by switching. In other words, the DC-DC converter 41 generates a stabilized output voltage $V_{cc}$ in such a way that a predetermined value ($V_{ref}$) of potential difference is obtained between the voltage entered through the feedback terminal $V_f$ and the output voltage $V_{cc}$.

The anode of the group of LEDs 30 connected in series is connected to the output terminal for output voltage $V_{cc}$ of the DC-DC converter 41 through the constant resistance ($R_c$). In addition, the anode of the group of LEDs 30 connected in series is also connected to the feedback terminal of the DC-DC converter 41 through the source-drain of the sample holding FET 46. The cathode of the group of LEDs 30 connected in series is grounded through the source-drain of the FET 43.

The gate of the FET 43 receives PWM signals from the PWM control circuit 44. The FET 43 works in such a way that the source-drain channel becomes on when the PWM signal is on, and the source-drain channel becomes off when the PWM signal is off. Therefore, the FET 43 supplies current to the groups of LEDs 30 when the PWM signal is on and shuts off current to the groups of LEDs 30 when PWM signal is off. In other words, the FET 43 causes the groups of LEDs 30 to emit light when the PWM signal is on and causes the groups of LEDs 30 to suspend light emission when the PWM signal is off.

The PWM control circuit 44 generates the PWM signal as a binary signal to control the duty ratio of on-time and off-time. The PWM control circuit 44 receives the value of light quantity detected by the luminance sensor 33, and it controls the pulse width of PWM signal so that the luminance of the groups of LEDs 30 connected in series coincides with the predetermined value of luminance. In other words, the PWM control circuit 44 increases the pulse width, thereby increasing the duration of light emission of the groups of LEDs 30, when the value of light quantity detected by the luminance sensor 33 is lower than the predetermined value of luminance. It also reduces the pulse width, thereby reducing the duration of light emission of the groups of LEDs 30, when the value of light quantity detected by the luminance sensor 33 is higher than the predetermined value of luminance.

The capacitor 45 is placed between the output terminal and the feedback terminal of the DC-DC converter 41. The resistance 47 is connected to the output terminal of the DC-DC converter 41 and the gate of the sample holding FET 46.

The hold timing circuit 48 receives the PWM signal and generates the hold signal which is off for a prescribed period of time at the edge of rise of the PWM signal and which is on otherwise.

The gate of the sample holding FET 46 receives the hold signal delivered from the hold timing circuit 48. The sample holding FET 46 works in such a way that the source-drain becomes on when the hold signal is off and the source-drain becomes off when the hold signal is on.

The LED drive circuit 31 mentioned above supplies current $I_{LED}$ to the groups of LEDs 30 only when the PWM signal from the PWM control circuit 44 is on. The sample holding circuit is composed of the capacitor 45, the sample holding FET 46, and the resistance 47. The sample holding circuit samples the value of voltage at the anode of the groups of LEDs 30 (that is, at one end of the resistance 42 which is not connected to the output voltage $V_{cc}$) when the PWM signal is on and then supplies it to the feedback terminal of the DC-DC converter 41. The DC-DC converter 41 is designed to stabilize the output voltage $V_{cc}$ according to the voltage value entered to the feedback terminal. Therefore, it is possible to make the peak value constant for the current $I_{LED}$ that flows to the constant resistance $R_c$ 42 and the groups of LEDs 30.

Consequently, the LED drive circuit 31 performs pulse driving according to the PWM signals while keeping the peak value constant for the current $I_{LED}$ flowing into the groups of LEDs 30. Thus, the LED drive circuit 31 is so controlled as to make the luminance of light emitted from the groups of LEDs 30 connected in series equal to the predetermined value of luminance according to the amount of light detected by the luminance sensor 33.

Moreover, the LED drive circuit 31 also has the desired value control circuit 49, which is designed to adjust the stabilized voltage value $V_{ref}$ for the output voltage $V_{cc}$ of the DC-DC converter 41 according to the value of temperature output from the temperature sensor 32.

The desired value control circuit 49 receives the value of temperature of the groups of LEDs 30 connected in series which has been detected by the temperature sensor 32. The desired value control circuit 49 has the table 50 which stores values indicating the change in luminance for change in temperature. While referencing this table 50, it generates the desired voltage value $V_{ref}$ so that the groups of LEDs 30 keep a constant luminance even though they change in temperature. The desired voltage value $V_{ref}$ generated by the desired value control circuit 49 is given to the DC-DC converter 41.

The DC-DC converter 41 generates the output voltage $V_{cc}$ so that the desired voltage $V_{ref}$ is obtained for the potential difference between the voltage entered from the feedback terminal $V_f$ and the output voltage $V_{cc}$.

The LED drive circuit 31, which is provided with the desired value control circuit 49 as mentioned above, adjusts the peak value of the current $I_{LED}$ flowing to the groups of LEDs 30 in response to the desired voltage value $V_{ref}$ generated by the desired value control circuit 49. Thus, the groups of LEDs 30 connected in series emit light at a constant luminance, without change in pulse width of PWM signals, even though they change in temperature.

According to the embodiment mentioned above, the color liquid crystal display unit 100 has the groups of LEDs connected in series under control by the same drive circuit, which are arranged in the region of the same temperature immediately behind the display unit. In addition, the color liquid crystal display unit 100 adjusts current for the groups of LEDs so as to retain a constant luminance even though the temperature changes. To be concrete, it performs PWM control for drive current so that the LEDs emit light with a constant luminance and it also adjusts the peak value of drive current so that the LEDs emit light with a constant quantity of light even though they change in temperature.

Thus, the color liquid crystal display unit 100 is intended to eliminate the fluctuation in luminance on the screen which results from variation in temperature.

The LED drive circuit 31 may be modified as follows.

As mentioned above, the backlight unit 20 is designed such that a certain number of LEDs connected in series are driven as a whole.

LEDs for red (R), green (G), and blue (B) primary colors need different drive circuits because they differ in emission efficiency. In other words, they differ in power consumption and emission efficiency. Therefore, the pulse width adjusted by PWM control varies for different colors. For example, about 50% of on-time is enough red LEDs immediately after lighting because red LEDs have high emission efficiency at a low temperature, whereas about 80-90% of on-time is necessary for blue LEDs which are poor in emission efficiency. In other words, different drive circuits are necessary for different colors.

Since the pulse width adjusted by PWM control for each color varies, it follows that the resolution assigned to adjustment of the pulse width for PWM control differs for the luminance of the groups of LEDs 30. For example, the resolution is rough for red and fine for blue. This means that the accuracy of adjustment varies depending on colors. The uneven accuracy of resolution for different colors is a hindrance to uniform white color.

FIGS. 13A to 13C show the difference in resolution in PWM control for different colors.

In FIG. 13A to 13C, it is assumed that the PWM control pulse can be divided in 256 steps (8 bits) to adjust a pulse width. FIG. 13A shows the PWM control pulse for red; FIG. 13B shows the PWM control pulse for green; and FIG. 13C shows the PWM control pulse for blue. It is assumed that it is necessary to mix the red, green, and blue colors in the following ratio to obtain the desired white color.
Blue with a PWM width of 256 (100% duty)
Green with a PWM width of 191 (75% duty)
Red with a PWM width of 126 (50% duty)
The blue color can be adjusted in 256 steps, whereas the red color can be adjusted only in 126 steps (or 7 bits). In addition, one-step width for blue corresponds to two-step width for red color. It is possible to improve the resolution by increasing the number of bits; however, this approach is not practical because it needs an expensive converter with a high accuracy.

For the reasons mentioned above, the LED drive circuit 31 changes the peak value of current (supplied to the groups of LEDs 30) so that the resolution of pulse width is the same for red, green, and blue LEDs. This is accomplished in practice by entering the control value of PWM into the desired value control circuit 49 to adjust the desired voltage value $V_{ref}$ at which the output voltage $V_{cc}$ remains stable.

If it is assumed that when the mixing ratio of red, green, and blue colors is adjusted for the same peak value of current, the PWM width for blue is 256 (100% duty), the PWM width for green is 191 (75% duty), and the PWM width for red is 126 (50% duty), then the peak value of current for red color should be adjusted to 50% as shown in FIG. 14A, the peak value of current for green color should be adjusted to 75% as shown in FIG. 14B, and the peak value of current for blue color should be adjusted to 75% as shown in FIG. 14C.

By changing the peak value of current for the groups of LEDs 30, it is possible to have the same resolution for red, blue, and green at the time of adjustment and hence it is possible to keep a balance for the accuracy of control on different colors.

What is claimed is:

1. A backlight unit installed in the back of a display unit, comprising:
   lighting units, each lighting unit comprising:
   a light emitting diode, and
   a temperature detecting unit to detect the temperature of the lighting unit, and
   a drive unit to control current supplied to the light emitting diode according to the temperature of the lighting unit, so that each lighting unit keeps a uniform brightness even though each lighting unit changes in temperature, to adjust current to be supplied to the light emitting diode by means of pulse width modulation, so as to keep at least the brightness of light emitted from each lighting unit uniform, to control the peak value of the current to be supplied to the light emitting diode, so that the resolution of pulse width is the same, and to adjust the peak value of current to be supplied to the light emitting diode in response to the detected temperature.

2. The backlight unit as defined in claim 1, wherein the drive unit controls current supplied to the light emitting diode, so that each lighting unit keeps a uniform brightness as well as a uniform chromaticity even though each lighting unit changes in temperature.

3. The backlight unit as defined in claim 1, wherein the temperature detecting unit detects the temperature of one of the lighting units having a malfunctioning temperature sensor according to information from a memory which previously stored the temperature of the lighting unit having the malfunctioning temperature sensor in response to the temperature of one of the lighting units at the position where a temperature sensor is installed.

4. The backlight unit as defined in claim 1, further comprising a light detecting sensor to detect the brightness of light emitted from the light emitting diode in each lighting unit, wherein the drive unit adjusts current supplied to the light emitting diodes so as to keep at least the brightness of light emitted from each lighting unit uniform.

5. A display unit comprising:
   a non-luminous screen of transmissive-type,
   lighting units, placed behind the screen, each lighting unit comprising:
   a light emitting diode, and
   a temperature detecting unit to detect the temperature of the lighting unit, and
   a drive unit to control current supplied to the light emitting diode according to the temperature of the lighting unit, so that each lighting unit keeps a uniform brightness even though each lighting unit changes in temperature, to adjust current to be supplied to the light emitting diode by means of pulse width modulation, so as to keep at least the brightness of light emitted from each lighting unit uniform, to control the peak value of the current to be supplied to the light emitting diode, so that the resolution of pulse width is the same, and to adjust the peak value of current to be supplied to the light emitting diode in response to the detected temperature.

6. The display unit as defined in claim 5, wherein the drive unit controls current supplied to the light emitting diode, so that each lighting unit keeps a uniform brightness as well as a uniform chromaticity even though each lighting unit changes in temperature.

7. The display unit as defined in claim 5, wherein the temperature detecting unit detects the temperature of one of the lighting units having a malfunctioning temperature sensor according to information from a memory which previously stored the temperature of the lighting unit having the malfunctioning temperature sensor in response to the temperature of one of the lighting units at the position where temperature sensor is installed.

8. The display unit as defined in claim 5, further comprising a light detecting sensor to detect at least the brightness of light emitted from the light emitting diode in each lighting unit, wherein the drive unit adjusts current to be supplied to the light emitting diode so as to keep at least the brightness of light emitted from each lighting unit uniform.

9. The display unit as defined in claim 5, which further comprises an optical system that uniformly mixes the colors of light emitted from each light emitting diode in each lighting unit, and wherein the drive unit acquires as a representative value the brightness or chromaticity detected by the light detecting sensor and adjusts current to be supplied to each light emitting diode in each lighting unit so that the lighting unit changes uniformly as a whole and the light emitted from each lighting unit remains constant in brightness or chromaticity.

* * * * *